Oct. 29, 1935.   A. R. THOMPSON   2,018,748
STACKED BOX DUMPING MACHINE
Filed July 28, 1931   3 Sheets-Sheet 3

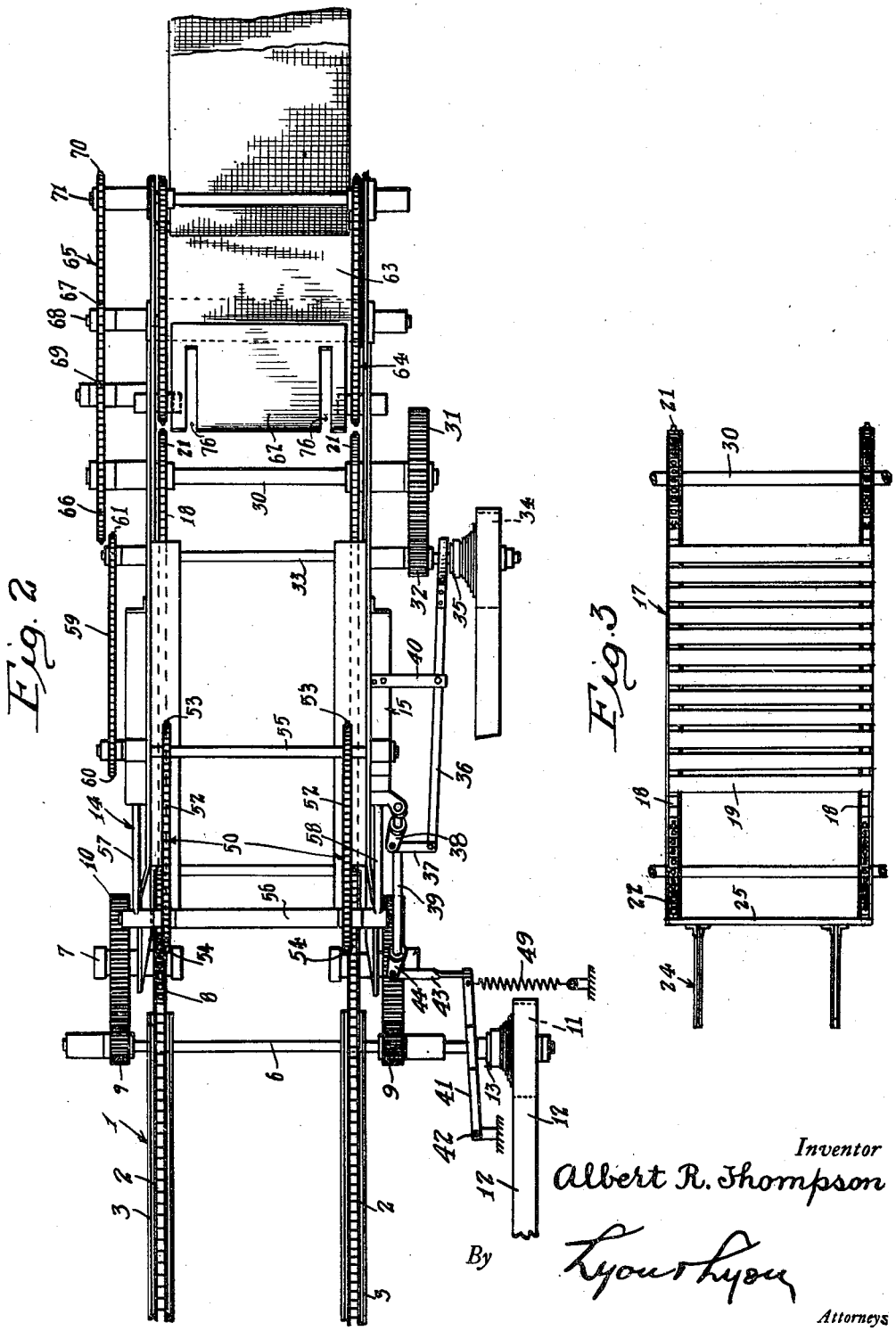

Inventor
Albert R. Thompson
By Lyon & Lyon
Attorneys

Patented Oct. 29, 1935

2,018,748

UNITED STATES PATENT OFFICE 2,018,748

STACKED BOX DUMPING MACHINE

Albert R. Thompson, San Jose, Calif., assignor to Food Machinery Corporation, San Jose, Calif., a corporation of Delaware Application July 28, 1931, Serial No. 553,585

12 Claims. (Cl. 214—1.1)

This invention relates to stacked box dumping machines, and more particularly to a machine for handling boxes of fruit or other material in stacks and for dumping the boxes of fruit or other material in stacks, and for dumping the boxes of fruit or other material one at a time so that the fruit or other material is conveyed from the machine to a point where it is to be subsequently treated or handled, and the empty boxes are conveyed from the machine to another point of disposal.

In the handling of fruit, particularly citrus fruit, it is customary to stack the boxes of fruit and allow the stacked fruit to remain in storage for a period of time after it is received from the orchard or grove to further mature or ripen in storage. The fruit in the boxes from the orchard is stacked in storage, and the boxes in stacks are then removed from storage upon hand trucks or the like, and the fruit is then removed from the boxes, washed, or otherwise treated and graded before it is packed.

In the handling of the boxes of fruit in storage, a great saving in labor is occasioned by the use of a machine which will handle these boxes in stacks and will dump the boxes one at a time, separating the fruit and the boxes. It is often customary to stack the boxes in storage in the cellar of a packing house while the treating and grading apparatus is maintained on a floor above the storage floor of the packing house, and it is necessary to elevate the boxes of fruit from their storage position within the basement of such a packing house to the main floor where the fruit is handled for packing.

It is therefore an object of this invention to provide a box stack elevating and dumping machine which includes a means for elevating stacks of boxes, means for dumping the boxes one at a time, and including feeding means controlled by the stack of boxes being elevated to move the stacks of boxes which have been placed into receiving position relative to the elevating means.

Another object of this invention is to provide a box stack elevating and dumping machine which includes a floor conveyor which is mounted in position just above the floor so that the boxes of fruit may be wheeled on the conveying means by the use of ordinary hand trucks without the conveying means interfering with the positioning of the stacks of boxes or the operation of the hand trucks used in positioning such stacks of boxes.

Another object of this invention is to provide a means for feeding stacks of boxes to an elevator, and means for elevating the boxes as fed which are operatively connected together so that the feeding and elevation of the stacks of boxes are controlled by the stack of boxes being elevated by the elevating means.

Another object of this invention is to provide a stacked box dumping machine which includes elevating means having a curve at its upper end of relatively large radius around which the boxes are caused to travel and to gradually tilt into dumping position, and in which elevator the boxes are caused to move through the upper curved end of the elevating means by the succeeding boxes as they are elevated by the elevating means.

Another object of this invention is to provide a box stack dumping machine which includes elevating and dumping means, a floor conveyor adapted to receive and present stacks of boxes to the elevating means, and means operatively connected between the floor conveyor and the elevating and dumping means which is alternately operated to arrest the motion of the floor conveyor and the elevating means, and which latter means are actuated by the stack of boxes upon the elevating means.

Other objects and advantages of this invention it is believed will be apparent from the following detailed description of a preferred embodiment thereof as illustrated in the accompanying drawings.

In the drawings:

Figure 2 is a top plan view thereof.

Figure 3 is a top plan view of the draper conveyor embodied in my invention.

Figure 1:
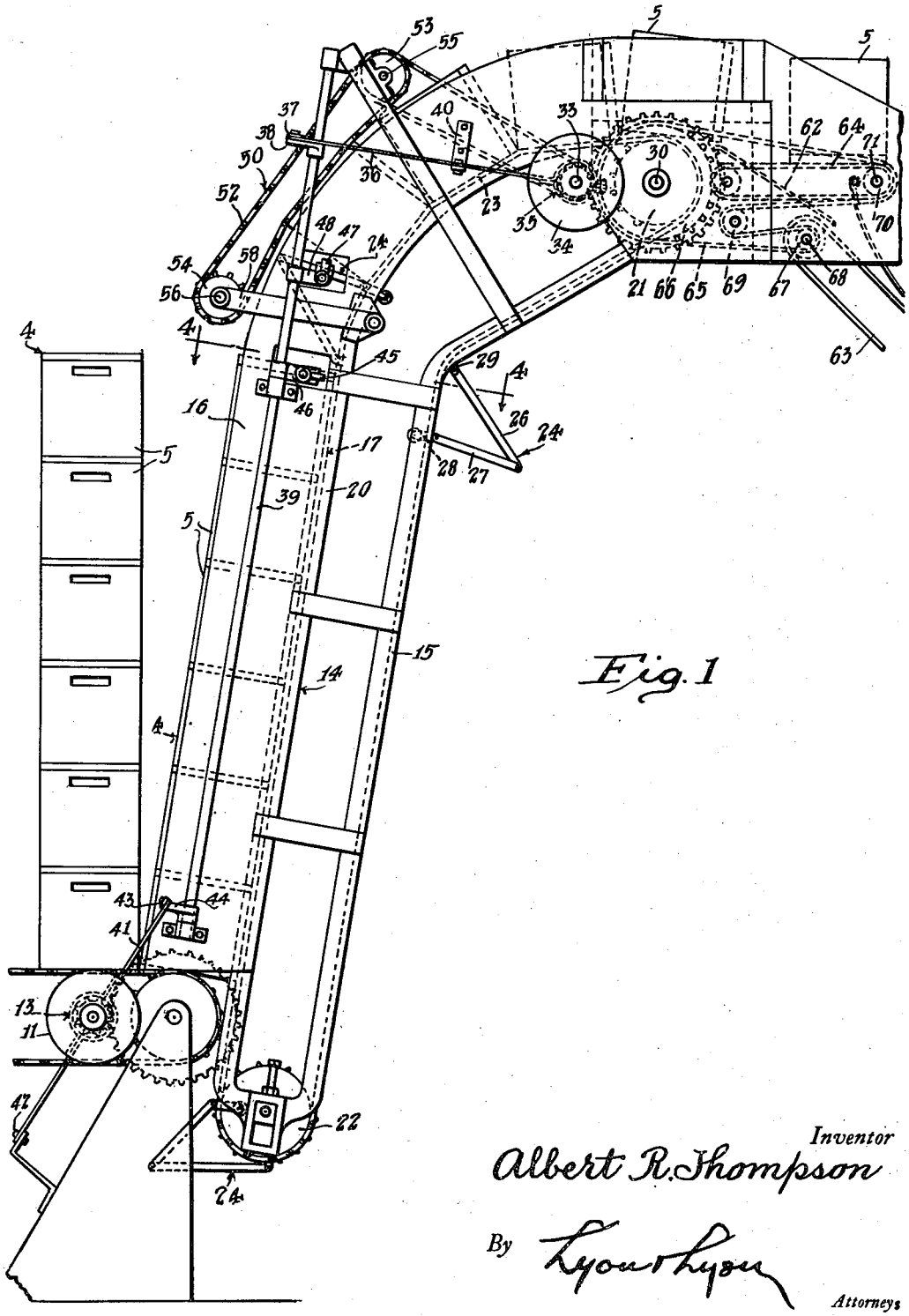
Figure 1 is a side elevation of a stacked box elevating and dumping machine embodying my invention.
Figure 4:
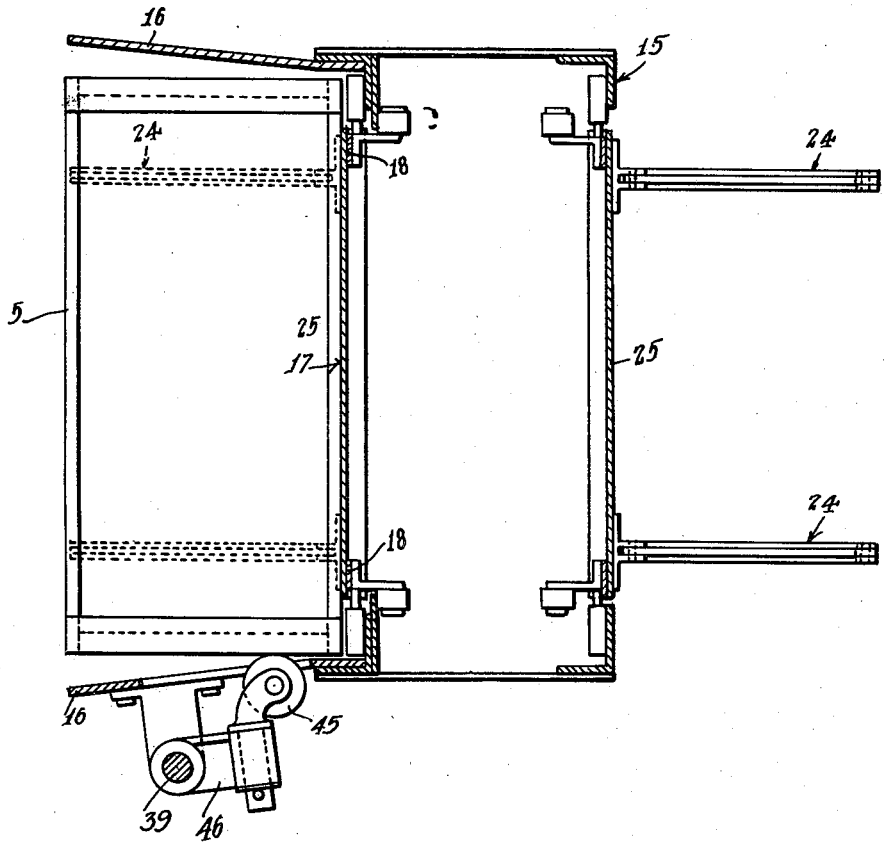
Figure 4 is a sectional view taken substantially on the line 4—4 of Figure 1.

In the preferred embodiment of my invention illustrated in the accompanying drawings, 1 indicates a floor conveyor composed of a pair of spaced carrier chains 2 mounted in guides 3 embedded in the floor so that the upper run of the chains 2 projects slightly above the surface of the floor so that the bottom of the stack 4 of boxes 5 will ride upon the conveyor 1 over the floor. The conveyor 1 is formed of the spaced chains 2 embedded in the guides 3 in the floor so that the conveyor 1 in the floor does not interfere with the free manipulation of the hand trucks utilized for the purpose of conveying the stacks 4 of boxes into position on the conveyor 1.

The conveyor 1 is driven from a shaft 6 which is supported in position in any suitable or desirable manner and drives the sprocket shafts 7 upon which the driven chain sprockets 8 are secured. The idler chain sprockets are not illustrated in the drawings, but their support and position may be accomplished in any suitable or desirable manner, which it is believed will be obvious to those skilled in the art.

The shaft 6 drives the sprocket shaft 7 by means of gears 9 secured to the shaft 6 in position to mesh with pinions 10 mounted on the sprocket shafts 7. The chains 2 are trained over the spaced driven sprockets 8. The shaft 6 is driven from any suitable or desirable source such, for example, as by means of a pulley 11 mounted on the shaft 6 and driven by means of a belt 12 from any suitable or desirable source of power. A clutch 13 is interposed between the pulleys 11 and the shaft 6 so as to enable the driving of the shaft 6 to be interrupted as desired.

At the end of the conveyor 1 there is positioned an elevator 14 which is slightly inclined from the vertical so that when the boxes are delivered to the elevator 14, they are conveyed upwardly in a stack in position inclined slightly from the vertical so as to eliminate any tendency of the stack to upset as it is being elevated. The elevator 14 includes a frame 15, to which side members 16 are secured. Supported by the frame 15 between the side members 16 is a draper conveyor 17 formed of a pair of spaced chains 18 between which draper slats 19 are secured. The conveyor 17 is guided in guides 20 of the frame 15 and is driven by means of drive sprockets 21 at the upper end of the frame 15, and is trained over idler sprockets 22 at the lower end of the frame 15.

The elevator 14 formed by the conveyor 17 is near its upper end curved on a curve of relatively large radius so that the boxes are propelled around this curve 23 formed by the innermost guide 20 by the lowermost boxes of each stack 4 in such a manner that as the boxes pass around the curve 23 they pass over onto their sides so that the contents of the boxes are propelled in advance of the boxes between the side members 16 until the boxes and the fruit are separated, as will hereinafter be set forth. When passing around the curve 23, the boxes are propelled along the curve 23 by the succeeding boxes of the stack.

Secured to the chains 18 of the conveyor 17 are elevating members 24 which are spaced along the chains 18 in position to engage the lowermost box 5 of each stack 4 of the boxes. The elevating members 24 are secured to cross members 25 secured between the chains 18 and are supported by means of brace members 26 likewise secured to cross members extending between the chains 18. The tread of the elevator 24 is formed by arms 27 which are pivotally secured to arms 28 secured to the cross members 25 at one end and are pivotally secured at their opposite ends to brace members 26 which in turn are pivotally secured to arms 29 of the cross members supporting the brace members 26.

The driven sprockets 21 of the conveyor 17 are secured to an elevator drive shaft 30 journaled to the frame 15. The shaft 30 is driven by means of a pinion 31 which meshes with a drive gear 32 secured to a drive shaft 33. The drive shaft 33 is driven from a drive pulley 34 through a releasable clutch 35. The pulley 34 is driven by any suitable or desirable source of power not shown.

In order to provide for the delivery of the stacks 4 to the elevator 14 and for the elevating of the stacks by the elevator 14 in proper timed relation, the clutches 13 and 35 are coupled together so that they are automatically actuated by the stack of boxes 4 while traveling through the elevator 14.

In order to accomplish this result, the shifter fork 36 for the clutch 35 is fulcrumed to a bracket 40 secured to the frame 15 and at its outer end is pivotally secured to a lever 37 which is in turn pivotally secured to a crank arm 38 of a clutch shifter shaft 39. The shifter fork 41 for the clutch 13 is pivotally supported as indicated at 42 at one end and at its opposite end is connected by means of a link 43 to a second crank arm 44 of the clutch shifter shaft 39. Carried by the clutch shifter shaft 39 is a floor conveyor clutch roller 45 which is secured to an arm 46 secured to the shaft 39. Likewise carried by clutch shifter shaft 39 is an elevator clutch shifter roller 47 carried by an arm 48 secured to the shaft 39. The rollers 45 and 47 are secured to the shifter shaft 39 in position to be engaged by the boxes 5 of the stack 4 as they are being elevated by the elevator 14.

Starting with the clutch 13 engaged, and with the stack of boxes in the position shown in full lines in Figure 1, the boxes are moved forwardly by the floor conveyor 1 until they are tipped into position to engage the conveyor 17. When the boxes engage the conveyor 17, the uppermost box engages the floor conveyor clutch shifter roller 45 moving that roller outwardly as viewed in Figure 1 to throw out the clutch 13 and at the same time to throw in the clutch 35, setting in motion the elevator 14.

The stack 4 of boxes is then elevated and passes by the elevator clutch shifter roller 47, holding this roller 47 outwardly, thereby holding the clutch 35 engaged and the clutch 13 disengaged until the lowermost box has passed above the roller 47, when the clutch 35 is thrown out and the clutch 13 is thrown in by the action of a spring 49 secured to the clutch shifter lever 41 at one end and anchored to a stationary support 45 at its opposite end.

In order to cause the boxes 5 of the stack 4 to follow the curvature of the curve 23 and not to continue upwardly, a tipping conveyor 50 is provided which consists of a pair of spaced chains 50 52 trained between sprockets 53 and 54 on the opposite sides of the frame 15 in position to engage the boxes 5 of the stack 4 as they are moved upwardly and cause the boxes to start around the curve 23 of the elevator 14. The sprockets 53 and 54 are secured to shafts 55 and 56 respectively, and the shafts 55 and 56 are journaled in bearings carried by supporting brackets 57 and 58 of the frame 15. The shaft 55 is driven by means of a chain 59 which is passed over a sprocket 60 secured to the shaft 55 and is driven by means of a sprocket 61 secured to the shaft 33.

In order to separate the fruit and the boxes to convey the fruit away to its point of subsequent treatment or handling, and to carry away the empty boxes, the following means are preferably provided:

Secured to the frame 15 is an inclined fruit chute 62 upon which the fruit is dumped from the boxes 5, passes and is conveyed away from the machine onto a traveling conveyor 63. Mounted in advance of the delivery end of the chute 62 is a box conveyor 64 to which the boxes 5 are delivered as they pass over the end of the conveyor 17 of the elevator 14. As the boxes 5 pass around the end of the conveyor 17 they are inverted upon the conveyor 64 so that all fruit is dumped from the boxes 5 before they are conveyed away by the conveyor 64. The conveyors 63 and 64 are driven by means of a chain 65 which passes around the drive sprockets 66 secured to the shaft 30 around a sprocket 67 secured to the drive shaft 68 of the conveyor 63 back around idler sprockets 69 supported by the frame 15, and around sprockets 70 secured to drive shaft 71 of the box conveyor 64, and hence back around sprocket 66.

In order to permit the elevating members 24 to pass the chute 62, chute 62 is slotted as indicated at 76.

Having fully described my invention, it is to be understood that I do not wish to be limited to the details herein set forth, but my invention is of the full scope of the appended claims.

I claim:

1. In a box stack elevating and dumping machine, a conveyor substantially flush with the floor, means for elevating and dumping successive stacks of boxes, a stack at a time, interrupting means operated by a stack of boxes being elevated for actuating the conveyor to position a stack of boxes in receiving position relative to the elevating means, and in successive relation beneath the stack of boxes on the elevating means.

2. A dumping machine for stacks of boxes, a conveyor substantially flush with the floor adapted to receive stacks of boxes, means for elevating and dumping successive stacks of boxes, a stack at a time, interrupting means for actuating the conveyor to feed the stacks of boxes to the elevating means, and means controlled entirely by the stack of boxes on the elevating means for controlling the interrupting means.

3. In a box dumping machine, the combination of means for elevating and dumping successive stacks of boxes, a stack at a time, means for feeding successive stacks of boxes to the elevating means, means for driving the elevating means, and means controlled solely by a stack of boxes on the elevating means for so timing the feeding of the stacks of boxes to the elevating means as to deliver each stack to the elevating means in successive relation beneath the preceding stack.

4. In a device of the class described, the combination of an endless elevator adapted to elevate successive stacks of boxes, a stack at a time, a floor conveyor adapted to convey and feed boxes in successive stacks to the elevator, and means under the sole control of a stack of boxes on the elevator for arresting the feeding of stacks of boxes to the elevator by the conveyor during the elevation of boxes by said elevator to a sufficient height to clear a succeeding stack of boxes and permit its receipt by the elevator in successive relation beneath the preceding stack.

5. In a stack dumping machine comprising, means for elevating and dumping successive stacks of boxes, a stack at a time, a floor conveyor adapted to receive and present stacks of boxes successively to the elevating means, and means for arresting the operation of the floor conveyor and the elevating means alternately, the latter said means being actuated by the stack of boxes on the elevator.

6. In a box stack elevating and dumping machine, means for elevating and dumping successive stacks of boxes, a stack at a time, feeding means for moving stacks of boxes into receiving position relative to the elevating means and means actuated by a stack of boxes on the elevating means for operating said feeding means to deliver a succeeding stack of boxes to the elevating means only after the elevating means has raised the stack of boxes thereon sufficiently to clear the succeeding stack of boxes so as to permit its receipt by the elevating means.

7. In a box stack elevating and dumping machine, means for elevating successive stacks of boxes, a stack at a time, feeding means to move stacks of boxes into receiving position relative to the elevator and means entirely controlled by a stack of boxes on the elevator for actuating said feeding means to deliver a succeeding stack of boxes to the elevator only after the elevator has raised the stack of boxes thereon sufficiently to clear the succeeding stack of boxes so as to permit its receipt by the elevator.

8. In a box dumping machine, the combination of means for elevating and dumping successive stacks of boxes, a stack at a time, driving means therefor, means for feeding successive stacks of boxes to the elevating means and means actuated by a stack of boxes on the elevating means for so timing the feeding of the stacks of boxes to the elevating means as to deliver each stack to the elevating means in successive relation beneath the preceding stack.

9. In a device of the class described, the combination of means for elevating and dumping successive stacks of boxes, a stack at a time, a floor conveyor adapted to convey and feed boxes in successive stacks to the elevator and means operable by a stack of boxes on the elevating means for arresting the feeding of stacks of boxes to the elevating means by the conveyor during the elevation of boxes by said elevating means to a sufficient height to clear a succeeding stack of boxes and permit its receipt by the elevating means in successive relation beneath the preceding stack.

10. In a stacked box dumping machine, an endless elevator having a curved upper portion, means for driving said elevator means for supporting a stack of boxes on the elevator so that they may be supported upon the curved portion of the elevator and propelled therearound into dumping position by succeeding boxes of the stack, and means for separating the boxes and fruit discharged from the elevator and directing them to separate points of discharge.

11. In a stacked box dumping machine, an endless elevator having a curved upper portion, means for driving said elevator means for supporting a stack of boxes on the elevator so that they may be supported upon the curved portion of the elevator and propelled therearound into dumping position by succeeding boxes of the stack, and means associated with the curved portion of the elevator for tipping the boxes to cause them to follow the curve into dumping position.

12. In a stacked box dumping machine, an endless elevator having a curved upper portion, means for driving said elevator means for supporting a stack of boxes on the elevator so that they may be supported upon the curved portion of the elevator and propelled therearound into dumping position by succeeding boxes of the stack, an endless tipping conveyor disposed adjacent the path of elevation of the boxes to tip the boxes and cause them to follow the curve into dumping position.

ALBERT R. THOMPSON.